Aug. 26, 1969   C. G. FARMER ET AL   3,462,826
METHOD OF SPEED PROGRAMMED WELDING
Filed July 29, 1966   11 Sheets-Sheet 1

INVENTORS.
CHARLES G. FARMER
CALVIN D. LOYD
ROBERT G. MILLER
THEODORE L. OBERLE

BY Fryer, Tjensvold, Feix & Phillips
ATTORNEYS

Aug. 26, 1969       C. G. FARMER ET AL       3,462,826
METHOD OF SPEED PROGRAMMED WELDING
Filed July 29, 1966                    11 Sheets-Sheet 2

INVENTORS.
CHARLES G. FARMER
CALVIN D. LOYD
ROBERT G. MILLER
THEODORE L. OBERLE
BY
Fryer, Tjensvold, Feix + Phillips
ATTORNEYS Aug. 26, 1969   C. G. FARMER ET AL   3,462,826
METHOD OF SPEED PROGRAMMED WELDING

FIG-5.

INVENTORS.
CHARLES G. FARMER
CALVIN D. LOYD
ROBERT G. MILLER
THEODORE L. OBERLE

INVENTORS.
CHARLES G. FARMER
CALVIN D. LOYD
ROBERT G. MILLER
THEODORE L. OBERLE

Aug. 26, 1969     C. G. FARMER ET AL     3,462,826
METHOD OF SPEED PROGRAMMED WELDING
Filed July 29, 1966     11 Sheets-Sheet 5

INVENTORS.
CHARLES G. FARMER
CALVIN D. LOYD
ROBERT G. MILLER
THEODORE L. OBERLE

BY
ATTORNEYS

Aug. 26, 1969     C. G. FARMER ET AL     3,462,826

METHOD OF SPEED PROGRAMMED WELDING

Filed July 29, 1966     11 Sheets-Sheet 9

Fig. 11.

| PARTS JOINED | | | | | SPEED PRO-GRAM | INITIAL R.P.M. | INTERMEDIATE R.P.M. | | PRESS. P.S.I. | TOTAL ENERGY FT. LBS | AVERAGE H.P. PER IN.$^2$ | TIME IN SEC. | SPEED CURVE |
|---|---|---|---|---|---|---|---|---|---|---|---|---|---|
| MAT'L SAE NO. | SIZE | MAT'L SAE NO. | SIZE | | | | | | | | | | |
| 1018 | 0.75 IN. DIA.BAR | 1018 | 0.75 IN. DIA.BAR | DECELER-ATING | 3,200 | — | | 17,700 | 10,410 | 15.4 | 1.23 |  |
| 1018 | 0.75 IN. DIA.BAR | 1018 | 0.75 IN. DIA.BAR | CONSTANT | 3,000 | — | | 15,710 | 11,820 | 15.8 | 1.36 |  |
| 1018 | 0.75 IN. DIA.BAR | 1018 | 0.75 IN. DIA.BAR | STEPPED | 3,100 | 2,540 | 1,080 | 15,400 | 14,300 | 19.4 | 1.34 |  |
| 1018 | 0.75 IN. DIA.BAR | 1018 | 0.75 IN. DIA.BAR | STEPPED | 3,250 | 2,920 | 410 | 15,390 | 14,580 | 19.1 | 1.39 |  |
| 1018 | 0.75 IN. DIA.BAR | 1018 | 0.75 IN. DIA.BAR | STEPPED | 100 | 3,000 | | 15,400 | 11,320 | 13.0 | 1.59 |  |
| XCO | 0.45 IN. DIA.BAR | 8650 | 0.45 IN. DIA.BAR | CONSTANT | 3,000 | — | | 57,320 / 89,200 | — | — | 10.00 |  |
| STELLITE | 0.45 IN. DIA.BAR | 8645 | 0.45 IN. DIA.BAR | CONSTANT | 3,000 | — | | 31,840 / 63,050 | — | — | 10.00 |  |
| 1018 | 0.75 IN. DIA.BAR | 1018 | 0.75 IN. DIA.BAR | STEPPED | 3,000 | 800 | 3,000 | 15,870 | 11,600 | 10.5 | 2.00 |  |

INVENTORS.
CHARLES G. FARMER
CALVIN D. LOYD
ROBERT G. MILLER
THEODORE L. OBERLE

BY Fryer, Tjensvold, Feix & Phillips
ATTORNEYS

Aug. 26, 1969   C. G. FARMER ET AL   3,462,826
METHOD OF SPEED PROGRAMMED WELDING
Filed July 29, 1966   11 Sheets-Sheet 10

INVENTORS.
CHARLES G. FARMER
CALVIN D. LOYD
ROBERT G. MILLER
THEODORE L. OBERLE
BY
ATTORNEYS

Aug. 26, 1969  C. G. FARMER ET AL  3,462,826
METHOD OF SPEED PROGRAMMED WELDING
Filed July 29, 1966  11 Sheets-Sheet 11

INVENTORS.
CHARLES G. FARMER
CALVIN D. LOYD
ROBERT G. MILLER
THEODORE L. OBERLE
BY
ATTORNEYS 3,462,826
METHOD OF SPEED PROGRAMMED WELDING
Charles G. Farmer, Edelstein, Calvin D. Loyd, Peoria,
Robert G. Miller, Princeville, and Theodore L. Oberle,
Washington, Ill., assignors to Caterpillar Tractor Co.,
Peoria, Ill., a corporation of California
Filed July 29, 1966, Ser. No. 568,920
Int. Cl. B23k 27/00, 31/02
U.S. Cl. 29—470.3                                           9 Claims

ABSTRACT OF THE DISCLOSURE

The drive for a friction welder is controlled to produce a programmed speed of rotation throughout the weld cycle.

---

This application relates to a welding process of the general kind in which end surfaces of two parts to be welded are pressed together in rotating rubbing contact at a common interface to heat the interface to a plastic weldable condition. This invention relates particularly to a method for controlling the rotational speed to produce any predetermined program of speed variation with time during the entire period the parts are engaged in rotating rubbing contact.

The welding process of the general kind noted above has developed as two separate techniques, conventional friction welding and inertial welding.

Conventional friction welding has been described in considerable detail in Russian and Czechoslovakian technical publications dating back to 1957. In the conventional friction welding process the end of one part to be welded is rotated against an end of the other part at a relatively constant speed and under a relatively constant load until the interface is heated to a plastic condition. The relative rotation is then rapidly stopped. Quite often the load is increased as rotation is stopped to compact the weld zone and to squeeze out impurities.

In the inertial process a control weight is connected for rotation with one of the parts to be welded. The weight is accelerated to a selected rotational speed to store a predetermined amount of energy before the parts are engaged. The parts are then pressed together under a desired load while the inertial energy stored in the weight is expended in heating and working the interface. The rotational speed of the inertial weight continuously decreases, and the entire energy of the inertial weight is preferably expended in welding the parts. This inertial process has numerous advantages over the conventional friction welding process. These advantages are discussed in detail in U.S. application Ser. No. 407,955 filed Oct. 27, 1964, now Patent No. 3,273,233 and assigned to the same assignee as the present invention. In brief summary, it may be noted that the inertial process provides two main advantages over the conventional friction welding process. The inertial process is much quicker and produces much more plastic working at low speeds. These two advantages combined to produce high quality welds.

Neither the conventional friction welding process nor the inertial process has provided for continuous control, or modification, of the process characteristics during the time that the weld is being made. Instead, both processes have in effect accepted the weld characteristics resulting from the speed and pressure initially selected.

It has been observed that the torque, heating rate and energy absorption characteristics of the weld process have numerous points of contact with the speed of rotation. For example, if the interface is heated to a plastic state and the speed of rotation then drops below a certain speed range (which varies with different materials), the torque at the interface will quickly increase by a substantial amount. The heating rate has also been found to vary with the speed with which the parts are rotated.

The present invention utilizes the interrelationship between the speed and the other process characteristics in a novel way to achieve novel and continuous control of the process.

It is a primary object of the present invention to program the speed of relative rotation throughout the weld cycle in a way that can be particularly suited to the specific parts and materials being welded. It is a related object to use a drive mechanism which can function to produce the desired variations in the speed, either up or down, at all stages in the welding process. It is a further object to combine with such a drive mechanism both a programmer which can be pre-set to generate the desired speed versus time relationship and a controller which forces the output speed of the drive mechanism to follow that relationship.

The present invention permits continuous control and substantially instantaneous change of the rotational speed throughout the weld cycle. As one result, the method and apparatus of the present invention can be employed to produce the same speed pattern and the same weld zone characteristics as the inertial process. It is a specific object of this invention to be able to produce an inertial type of weld without the use of inertial weights.

The present invention is of course not limited to duplicating an inertial weld. It is more flexible in that it permits continuous control, and variation, of the weld process. The rate at which the speed can be changed and the range over which the speed can be varied are particularly important features of the present invention. The speed can be moved at will from a heating range of speeds to a forging range of speeds, and, where necessary, from the forging range back to the heating range. The present invention also permits staying in the forging range for as long as desired. A process and apparatus which permit these modes of operation constitute further specific objects of the present invention.

It is another object of the present invention to use a change of speed from fast to slow, and in some cases from slow to fast, to spread the heat pattern. The present invention thus does not rely only on the thermoconductivity of the materials to spread the heat.

In a preferred form of the present invention a variable speed hydrostatic transmission is used to drive the rotating part. A hydrostatic transmission has comparatively low inherent inertia. A hydrostatic transmission is also capable of a high response rate and can be designed to develop whatever torques are required in the welding process. A hydrostatic transmission will also develop maximum torques at minimum rotational speeds and therefore is a fortunate drive means for the weld process in which high torques are required at low speeds. It is a further, specific object of the present invention to incorporate a variable speed hydrostatic transmission in the drive for a speed programmed welder.

In accordance with the present invention a speed programmer and a controller are operatively associated in the control for the variable speed hydrostatic transmission in a manner which permits continuous and effective control throughout all parts of the weld process. A speed programmed welding machine having a variable speed hydrostatic transmission programmer and control as described constitutes a further specific object of the present invention.

Other and further objects of the present invention will be apparent from the following description and claims and are illustrated in the accompanying drawings which, by way of illustration, show preferred embodiments of the present invention and the principles thereof and what are now considered to be the best modes contemplated for applying these principles. Other embodiments of the invention embodying the same or equivalent principles may be used and structural changes may be made as desired by those skilled in the art without departing from the present invention and the purview of the appended claims.

In the drawings:

FIGS. 6A and 6B through FIGS. 10A and 10B are traces of weld characteristics developed in the course of weld operations performed by the machine shown in FIG. 1;

FIGS. 12 through 15 show typical speed-time curves that can be selected and produced by the machine shown in FIG. 1;

Figure 1:
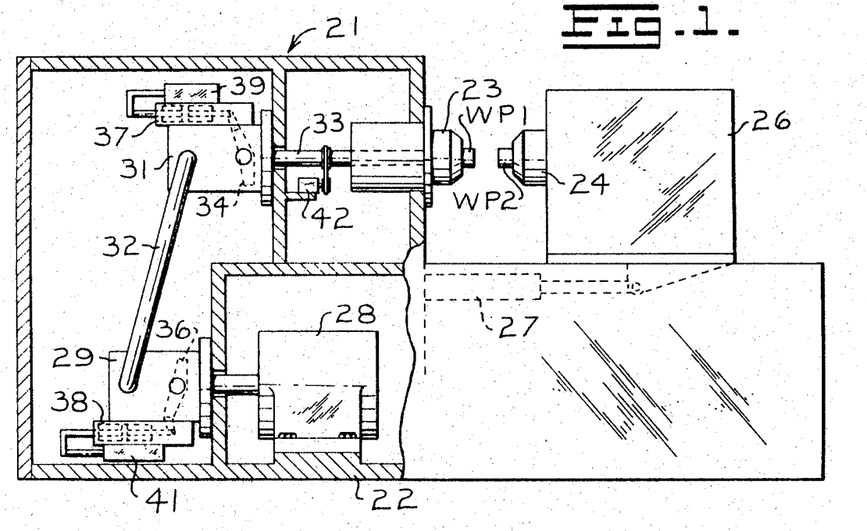
FIG. 1 is a side elevation view, partly broken away to show details of construction, of a speed programmed welder constructed in accordance with one embodiment of the present invention.

A speed programmed welding machine constructed in accordance with one embodiment of the present invention is indicated generally by the reference numeral 21 in FIG. 1.

The machine 21 includes a frame 22.

The two parts to be welded, workpieces WP1 and WP2, are mounted within chucks 23 and 24.

Figure 16:
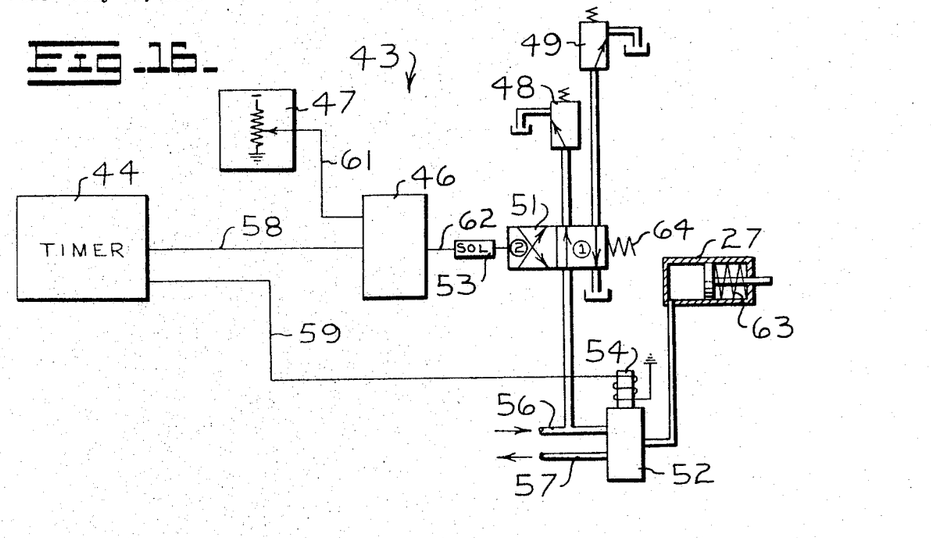
FIG. 16 is a fragmentary view showing details of a pressure programming arrangement for the machine shown in FIG. 1.

The chuck 24 does not rotate and is mounted on a fixture 26. The fixture 26 is in turn mounted for axial movement on the machine frame 22 under the control of a load cylinder 27. A pressure programming circuit, as shown in FIG. 16 and described in greater detail below, regulates the pressure in the load cylinder, and thus determines the force with which the parts WP1 and WP2 are engaged.

The chuck 23 is mounted for rotation, but is not movable in an axial direction.

The machine 21 includes variable speed drive means for rotating the chuck 23 and for changing the speed of rotation of the chuck 23 during a weld operation. In the embodiment shown in FIG. 1 the drive means include an electric motor 28, a hydrostatic pump 29 and a hydrostatic motor 31. The pump 29 is driven by the motor 28 and supplies pressurized fluid to the motor 31 through a manifold 32. The hydrostatic motor 31 drives the rotatable chuck 23 by a drive shaft 33.

The rotational speed of the motor 31 is determined by the angular position of a cam 34 in the motor and a cam 36 in the pump. Moving the cam 34 to increase the displacement of the motor 31 will, for any given volume of fluid supplied from the the motor 29, decrease the rotational speed of the motor 31 and shaft 33. Moving the cam 36 to increase the displacement of the pump 29 will, for any given position of the cam 34 in the motor 31, increase the rotational speed of the motor 31 and shaft 33.

The position of the cam 34 is set by a hydraulically actuated displacement control 37. The position of the cam 36 is set by displacement control 38.

The machine 21 may also preferably include sensing units 39 and 41 (rectilinear potentiometers in the machine illustrated in FIG. 1) for sensing the position of the cams 34 and 36. The sensing units 39 and 41 serve as part of a feedback arrangement which will be described below in greater detail with reference to FIG. 5.

The machine 21 includes a tachometer generator 42 for generating a signal corresponding to the actual rotational speed in the shaft 33. This signal may be used in the feedback arrangement. It may also be used in recording the actual speed.

The pressure programming control for the machine 21 referred to above is shown in FIG. 16 and is indicated generally by the reference numberal 43. The control 43 provides automatic regulation of the hydraulic fluid pressure supplied to the load cylinder 27 after the weld cycle is started.

The control 43 includes a timer 44, a comparator 46, a bias voltage source 47, adjustable pressure relief valves 48 and 49, valves 51 and 52, and solenoids 53 and 54 for controlling the positions of valves 51 and 52.

The pressurized fluid for the cylinder 27 is supplied through a conduit 56 by a pump which is not shown. A return conduit 57 leads to a reservoir which is also not shown.

The timer is connected to the comparator 46 by a line 58 and is connected to the solenoid 54 by a line 59.

The comparator is connected to the bias voltage source 47 by a line 61 and is connected to the solenoid 53 by a line 62.

The valve 51 functions to change the inlet fluid pressure between the levels determined by the adjustable pressure relief valves 48 and 49 when the valve 51 is shifted between the number 1 and number 2 positions shown in FIG. 16. This causes the load exerted by the load cylinder 27 to vary accordingly.

In operation, as the start cycle button is pressed to initiate the weld cycle, the timer 44 functions to energize the solenoid 54 to switch valve 52 to a position in which pressurized fluid from the inlet conduit 56 is directed to the load cylinder 27. At this time valve 51 is in the number 1 position and the adjustable pressure relief valve 48 controls the pressure level to cause the load cylinder 27 to exert the desired initial load.

The timer 44 may be preset for any desired time interval to direct a voltage to comparator 46 which matches the bias voltage from the source 47. When this happens the comparator energizes solenoid 53 and switches valve 51 to the number 2 position. The inlet conduit 56 is then disconnected from the adjustable pressure relief valve 48 and is connected to the adjustable pressure relief valve 49. In most cases the valve 49 will be set for a higher pressure than the valve 48 so that the load exerted by the loading cylinder 27 will increase.

When the weld is completed the solenoid 54 is de-energized, and the valve 52 is returned to a neutral position. This communicates the load cylinder 27 with the return conduit 57 and permits the spring to retract the piston of the load cylinder. The load cylinder 27 can also be a double acting cylinder, and the valve 52 can be adapted to direct pressurized fluid to the rod end of the cylinder for returning the piston after the weld is completed.

The solenoid 53 is also de-energized at the end of the weld cycle, and the spring 64 returns the valve 51 to the number 1 position illustrated.

Figure 5:
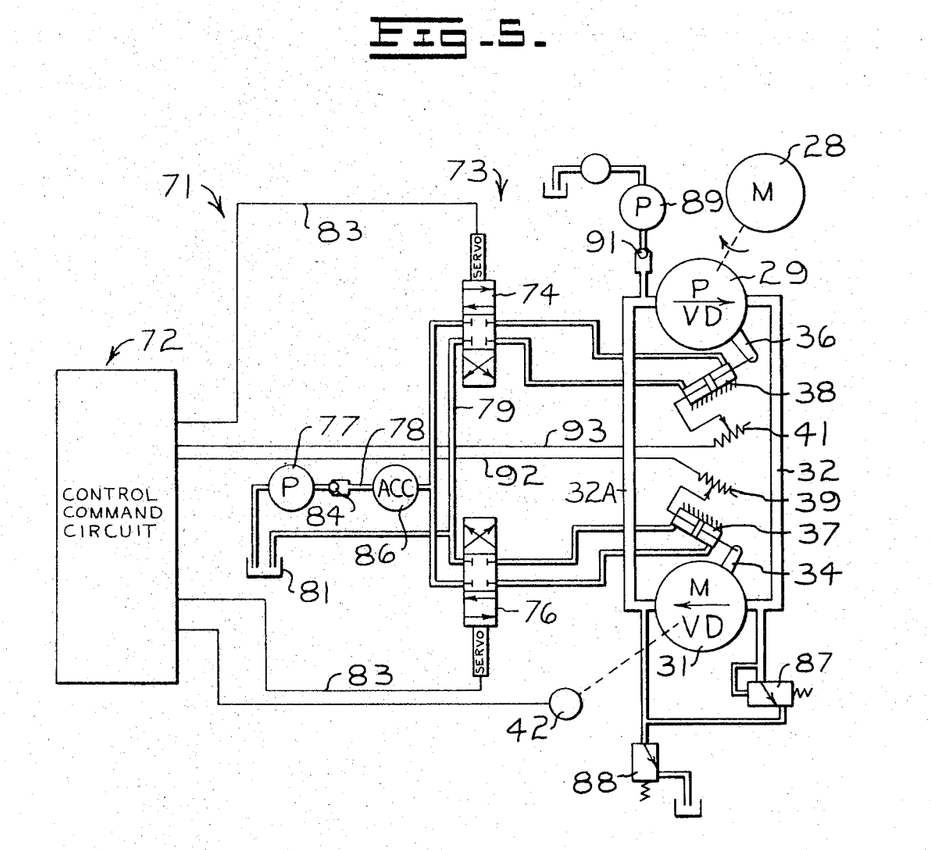
FIG. 5 is a schematic view of a control circuit for the machine shown in FIG. 1.

The machine 21 includes speed programming means for selecting and producing a predetermined variation of the rotational speed with time, that is, a desired speed versus time relationship, throughout the entire welding period. The speed programming means are schematically illustrated in FIG. 5 and are indicated generally by the reference numeral 71.

The means 71 include a programmer 72 and a controller 73.

The programmer 72 generates a desired speed signal and the controller 73 forces the output speed of the shaft 33 to equal the programmed speed by applying an appropriate torque to the parts being welded. In the form illustrated in FIG. 5 the programmer is electrical and includes a diode function generator and a time generator. While details of the circuitry of the programmer are covered in a separate application, it may be noted here that the diode function generator approximates the desired speed versus time function by a series of straight line segments. The number of segments usable in the presentation depends upon how exact the curve must be fitted and the number of segments available. The diode function generator has variable break points with adjustable slope. The break point is the point of intersection between two straight line segments comprising a portion of the curve. The slope dials determine the slope of each of the straight lines. The summation of the straight line segments then approximates the function desired. The time generator sweeps the diode function generator and provides the time axis for the program. The sweep rate or time axis during the reset and weld portion of the cycle are controlled by the reset sweep rate dial and weld sweep rate dial respectively. Other programming means, such as cam surfaces, tape or punched cards can also be used for generating the desired speed signal.

The controller 73 includes electro-hydraulic servo valves 74 and 76 which control the flow of pressurized fluid from a pump 77 through a conduit 78 to the displacement controls 38 and 37. Valves 74 and 76 can also control the return flow of fluid through a conduit 79 from the displacement controls 38 and 37 to a tank 81.

The pump develops sufficient pressure in the control circuit to produce rapid response of the displacement controls 37 and 38 to changes in the desired speed setting. The speed signal from the programmer 72 is supplied to the servo valves 74 and 76 through lines 82 and 83. The hydraulic circuit for actuating the displacement controls 37 and 38 also includes a check valve 84 and an accumulator 86 downstream of the pump 77.

The hydraulic circuit for the hydrostatic pump 29 and motor 31 includes a high pressure relief valve 87. In one form of the present invention the high pressure relief valve 87 was set to limit the maximum operating pressure of 5,000 p.s.i. and the low pressure relief valve 88 was set for 100 p.s.i.

The hydraulic circuit for the pump 29 and motor 31 also includes a replenishing pump 89 and a check valve 91 to replenish any system fluid losses. This maintains a minimum inlet manifold pressure in the return manifold 32A to avoid cavitation of the pump 29.

The speed programming means 71 is a closed loop, active system which includes feedback means for comparing the actual speed with the programmed speed. The feedback means are effective to eliminate differences between the actual and the programmed speeds. These feedback means include the rectilinear potentiometers 39 and 41 which sense the actual position of the cams 34 and 36. The feedback signals thus generated by the sensing units 39 and 41 are sent back to the programmer through lines 92 and 93. The desired speed and actual speed are compared in the programmer and an appropriate signal is supplied to the servo valve 74 and servo valve 76 if any correction is required.

In the operation of the machine 21 thus far described the desired speed versus time relationship is first programmed into the programmer 72. The speed versus time curve might, for example, have a shape like one of the curves illustrated in FIGS. 12 through 15. The shape might also be like one of the curves illustrated in the last vertical column of the chart shown in FIG. 11. Depending upon the particular parts and material to be welded, the desired speed versus time curve might also have some other particular configuration which would be best suited for that particular weld. In any event the programming means 72 would be programmed to produce that particular curve.

At the same time the pressure programming means 43 are programmed to produce the desired pressure versus time relationship if something other than a constant pressure is desired.

The electric motor then accelerates the hydrostatic pump 29 and motor 31 to the selected initial speed, and the load cylinder 27 shifts the fixture 26 and nonrotatable chuck 24, to the left as viewed in FIG. 1, to engage the parts WP1 and WP2 in rubbing contact. In most cases, if the initial desired speed is relatively high, there will be a slight initial departure of the actual speed from the desired speed (as indicated at 94 on the actual speed trace shown in FIG. 6A). This slight departure is quickly corrected, and for the rest of the weld cycle the actual speed corresponds quite closely with the desired speed.

In the machine 21 the control of the rotational speed of the shaft 33 is divided between the displacement controls for the cam 34 and the cam 36. The cam 34 for the motor is held at a maximum angle for the speed range of zero to 1500 r.p.m., and the angle of the pump cam 36 is varied to control the speed during this range. From 1500 r.p.m. to full speed (about 3000 r.p.m. in one operating form of the machine shown in FIG. 1) the angle of the pump cam 36 is held constant and the angle of the motor cam 34 is varied.

Figure 2:
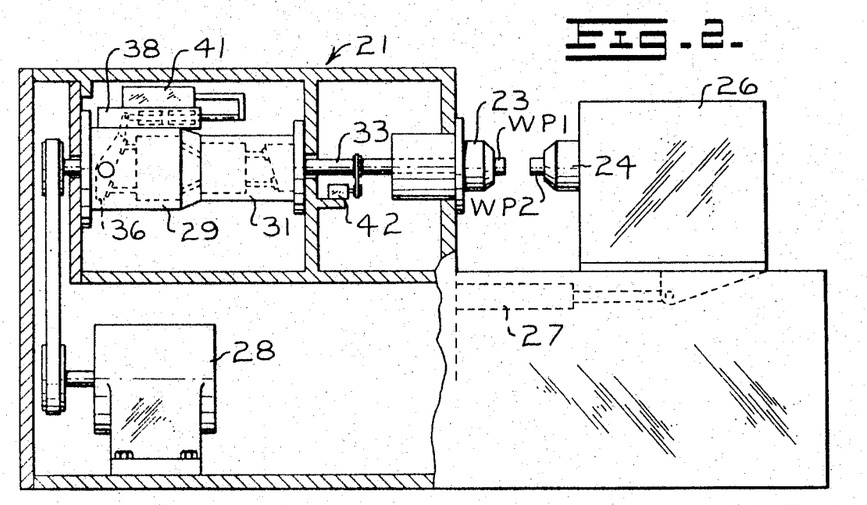
FIG. 2 is a view like FIG. 1 showing a speed programmed welder constructed in accordance with another embodiment of the present invention.

FIG. 2 shows a machine which is generally like the machine shown in FIG. 1 with the exception that the hydrostatic pump 29 and hydrostatic motor 31 have been mounted in an end to end relationship to eliminate the need for lengthy manifolds connecting the two units. In the modified machine shown in FIG. 2 a larger pump is used so that only a single displacement control 38 is required to control the output speed of the shaft 33. The motor 31 is a fixed displacement hydrostatic motor. The remainder of the machine 21 shown in FIG. 2 is substantially the same machine shown in FIG 1.

The hydrostatic motor has relatively low inherent inertia and is capable of a high response rate so as to make it especially suitable as the drive means for the speed programmed process.

The hydrostatic pump and motor combination can also be used as a brake to absorb excess energy in the event such small parts are to be welded on the machine that even the low inherent inertia of the hydrostatic motor would be excessive. In this event the braking is accomplished by reversing the displacement cam in the pump so that the motor acts as a pump and the pump acts as the motor. The amount of energy absorbed by the transmission in that mode of operation can be easily controlled by providing an adjustable relief valve in the drive circuit. The energy required to blow the relief valve will be absorbed by the transmission and the energy in excess of that required to blow the relief will be available to the weld interface for making the weld.

Figure 17:
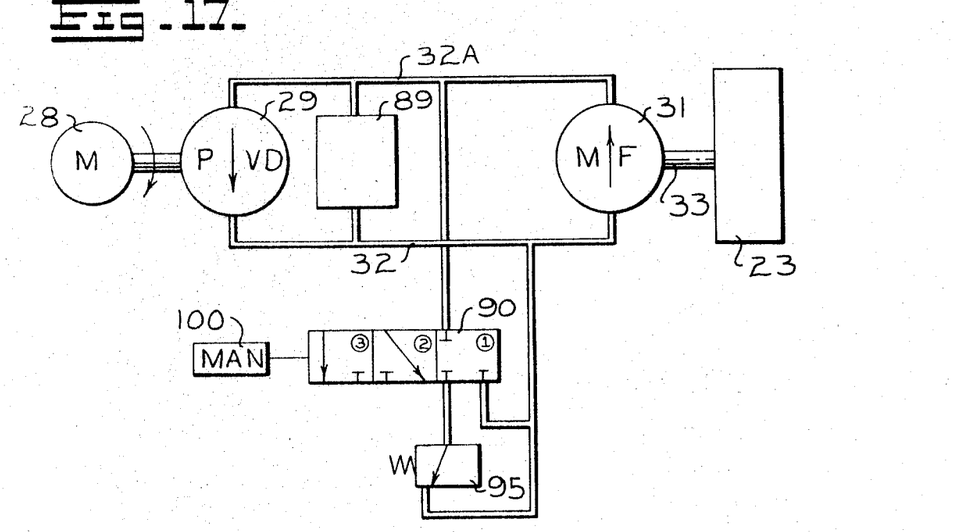
FIG. 17 is a schematic view of a hydraulic circuit incorporating a relief valve for controlling the amount of energy delivered to the weld interface.

FIG. 17 shows a hydraulic circuit which permits controlled braking of the hydraulic motor. In the circuit shown in FIG. 17 an electric motor 28 drives the variable displacement hydraulic pump 29. The pump 29 supplies pressurized fluid through a manifold 32 to the hydraulic motor 31. The hydraulic motor rotates the drive shaft 33 and spindle which includes the chuck 23. A replenishing pump and valve group 89 supplies makeup fluid to compensate for that leaking from the circuit during operations.

The circuit shown in FIG. 17 also includes a spool valve 90 which is connected across the supply manifold 32 and return manifold 32A. The spool valve is shiftable to one of the three positions illustrated by a manual valve positioner 100. The circuit also includes a variable pressure relief valve 95.

In operation, with the spool valve 90 in the number 1 position shown, the hydraulic motor 31 and the spindle 1 may be accelerated by the electric motor 28 and the variable displacement hydraulic pump 29 since the communication, through the valve 90, between the manifold 32 and 32A is blocked. When the spindle and chuck 23 reach the desired speed the chuck and drive shaft 33 may be allowed to freewheel by moving the valve 90 to the number 2 position. This places the manifolds 32 and 32A in open communication and thus short circuits the drive circuit. The pump 29 may be set to zero displacement at this time.

To use the transmission as a brake the valve 90 is moved in the number 3 position. The motor outlet conduit 32A is then in communication with the motor inlet conduit 32 by way of the variable pressure relief valve 95. The adjustment of the relief valve will then determine the amount of energy which is available to the weld to generate heat. That is, the energy in the rotating drive shaft 33 spindle and chuck 23 required to create sufficient pressure to open the relief valve 95 will be absorbed in the transmission. The remainder of the energy in the rotating components, in excess of that required to open the relief valve, will be available to the weld to generate heat.

FIGS. 12 through 15 illustrate some typical speed time curves which can be programmed into the speed programmed welder described above.

Figure 12:
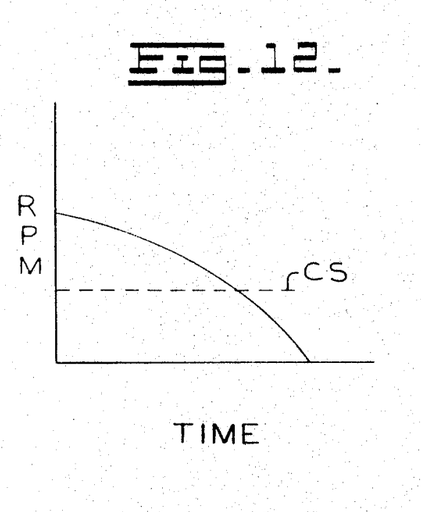

The generally parabolic shaped speed time curve shown in FIG. 12 is characteristic of an inertial weld using a relatively large flywheel rotating at a relatively low initial velocity. The rate of decay of the flywheel speed would be considerably slower than would be the case if the same amount of stored energy was stored in a smaller flywheel rotating at a high initial speed.

Figure 14:
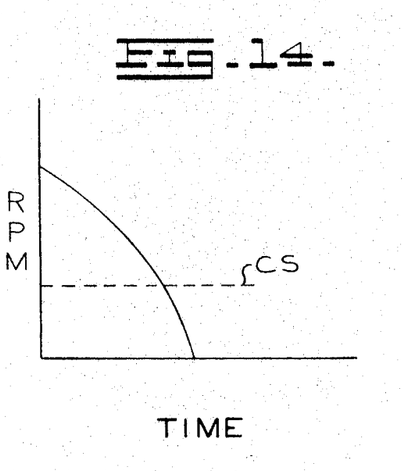
Figure 15:
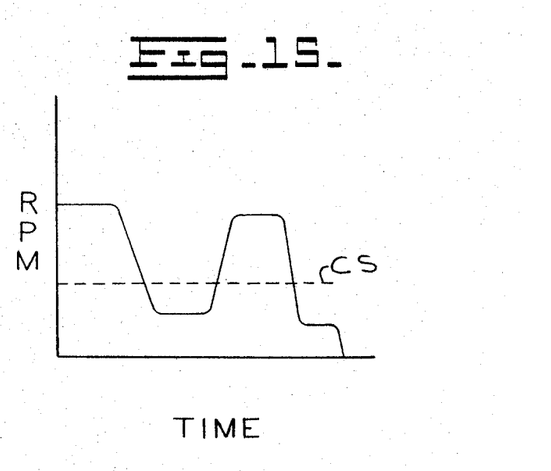

FIG. 14 shows a speed time curve which is typical of an inertial process in which the smaller flywheel is rotated at a higher initial speed. Both of these speed time curves can be readily reproduced with the speed programmed welder described above.

As noted generally above in the introduction of this application, rotation of the parts to be welded above a certain range of speeds results primarily in heating with little plastic working or forging, and rotation of the parts below a certain range of speeds results primarily in heavy plastic working or forging. As also noted above, the speed range dividing the heating range from the forging rang will vary with different materials. It also is not sharply defined for any particular parts because of the velocity gradient across the radius of the rotating parts. As the rotational speed of the parts is decreased the portion of the interface nearer the axis of rotation will go into the forging range before the portions of the interface farther away from the axis of rotation. Nevertheless, for any particular parts there is a band of speeds below which the torque increases appreciably so as to indicate that the parts being welded are entering the forging range, and this band of speeds is indicated generally by the broken line CS in each of FIGS. 12 through 15. The critical speed range CS can also be illustrated as occurring at about the points indicated by the arrows CS on the speed curve shown in FIG. 10A.

With continued reference to FIGS. 12 and 14 it can be seen that operation along the flatter speed curve shown in FIG. 12 will produce a more extended period of rotation in the forging range. In most cases this is desirable and beneficial to the weld structure.

The speed range indicated by the line CS also represents the speed range at which a weld can form between the rotating parts if the interface has been heated to a plastic state.

Figure 13:
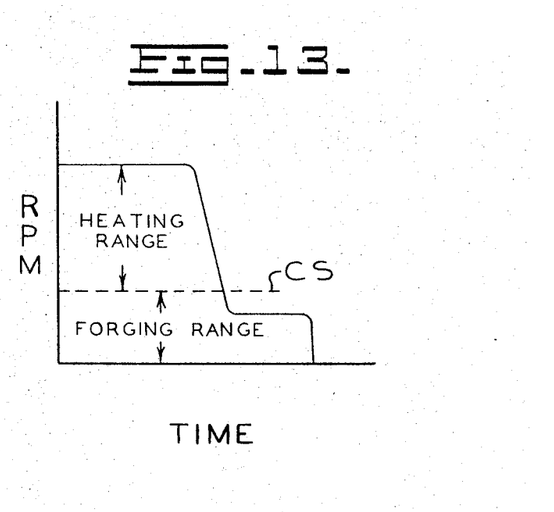

The continuously decreasing velocity curve illustrated in FIGS. 12 and 14 may not be best suited for producing the required heating. In some cases a curve more like that shown in FIG. 13 is more effective and more efficient. As illustrated in FIG. 13 the parts are rotated at a relatively constant high speed in the heating range and the speed is then quickly dropped to a speed in the forging range. The amount of forging is then controlled by both speed and by the amount of time the parts are rotated in the forging range.

As noted generally above, the heating of the interface can be influenced not only by the speed at which the parts are rotated but also by variations in the speed at which the parts are rotated. A change in speed does have the effect of spreading the heating radially across the interface. This spreading effect can be particularly important when parts of large diameter, and consequent large velocity gradients and large masses, are being welded. When large diameter bars are welded there can be problems in eliminating center defects. The areas of the interface near the axis of rotation may not be heated sufficiently and may not be worked sufficiently to fragment, disperse, and eject inclusions which act as stress raisers. The speed time cycle illustrated in FIG. 15 has been found effective to minimize problems of center defects. In this cycle the parts are subjected to a period of heating, the parts are then subjected to forging, and the parts are then subjected to an additional period of heating before a final forging step. The cycling back and forth between the heating and forging ranges produces thermal and mechanical effects which are useful for welding parts of large diameter.

It should be noted that the speed time cycle illustrated in FIG. 13 could be produced by a planetary type of power shift transmission programmed to shift under power from a high speed to a lower speed at a predetermined instant in the weld cycle. Such a machine could not of course operate over the full range of speeds which can be produced by the hydrostatic drive arrangement described above. Such a machine might however have utility for high volume production of one particular kind of welded article.

FIGS. 6A through 10B are traces of process characteristics as recorded during specific weld operations performed with the machine shown in FIG. 1. These traces shown the versatility of the speed programmed welder. In each figure the actual speed and the pressure and torque are shown in the A view while the desired speed, energy and horsepower traces are shown in the B view. These traces were separated in two different views to make the traces easier to follow.

Figure 10A:
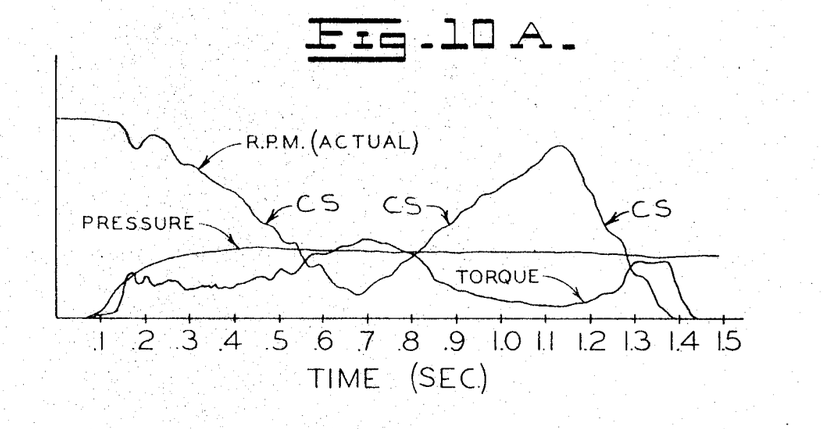
Figure 10B:
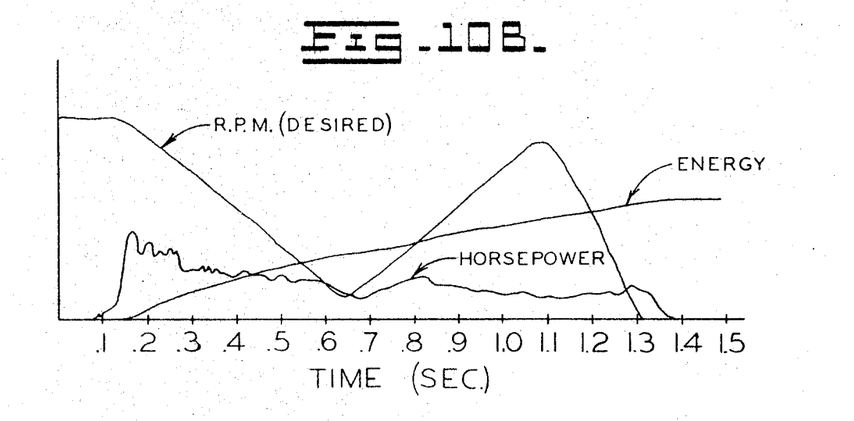
Figure 11:
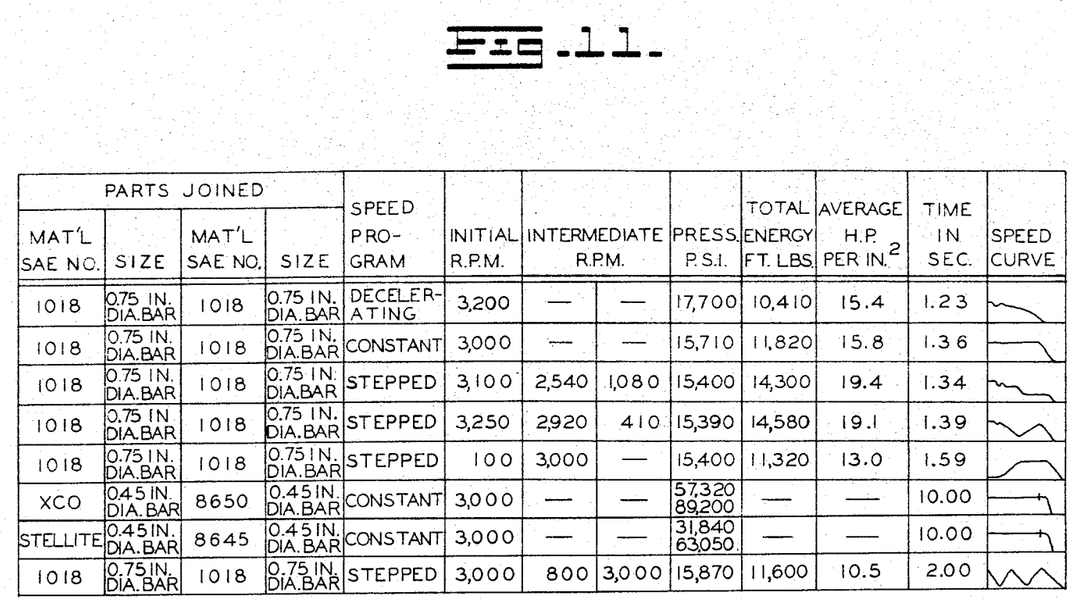
FIGURE 11 is a chart giving data relating to weld operations performed on the machine shown in FIG. 1.

The first five horizontal data lines of FIG. 11 correspond respectively to FIGS. 6 through 10.

Figure 6A:
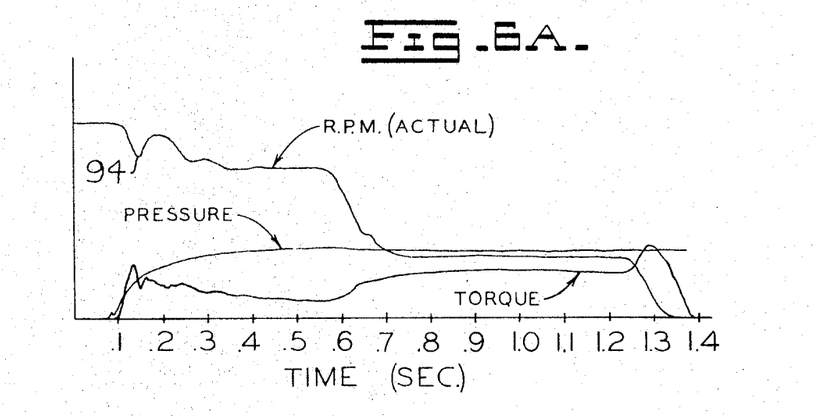
Figure 6B:
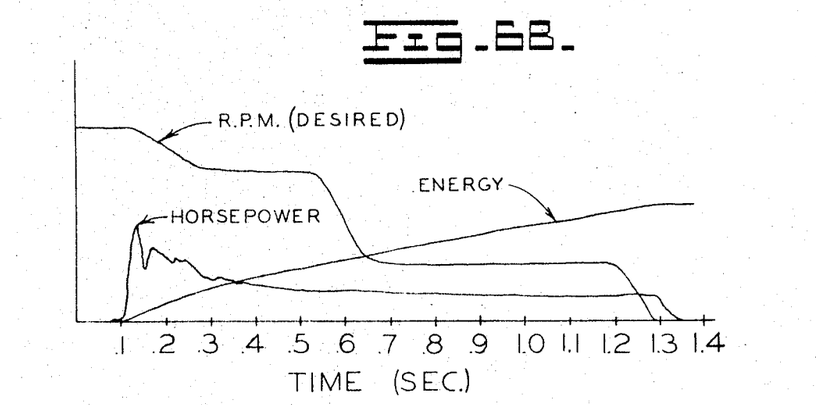

With a specific reference now to FIGS. 6A and 6B, the weld process operation from which these traces were taken included engagement of the parts at a relatively high initial speed, followed by reduction to a lower speed and a period of heating at this second speed, a reduction to a second lower speed within the forging range and an extended period of constant speed rotation in the forging range.

Figure 7A:
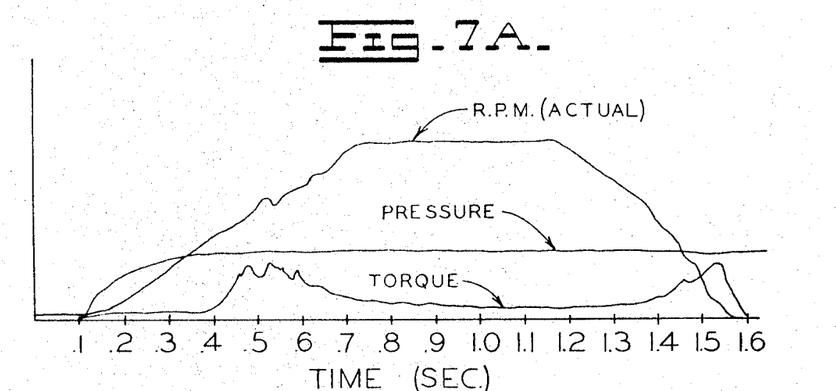
Figure 7B:
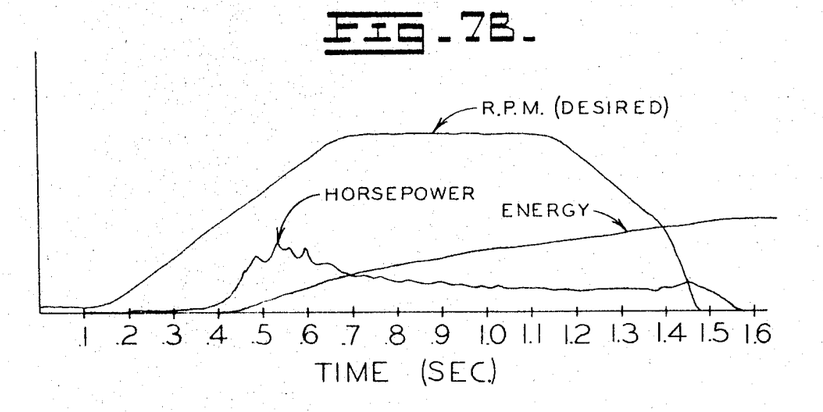

The weld operation from which the traces of FIGS. 7A and 7B were taken included engagement of the parts at a very low initial rotational speed. The speed was then increased to a speed well within the heating range and was maintained at that level until the required amount of heating had been produced. After that the speed was decreased and ultimately stopped in the manner indicated.

Starting the weld cycle with the parts engaged under pressure at zero velocity or nearly zero velocity can have some advantages. The parts tend to slide on an oxide scale so that there is almost no problem of stalling at the start. This mode of operation can also be advantageously combined with a gradual buildup in the axial load to limit the power which is consumed in the initial part of the weld cycle and also to minimize the initial torque. This kind of programmed speed cycle can also help prolong the machine life since the bearings are not subject to high load at high speeds as is the case in most other weld cycles where the parts are initially engaged at a relatively high speed and under a substantial load.

Figure 8A:
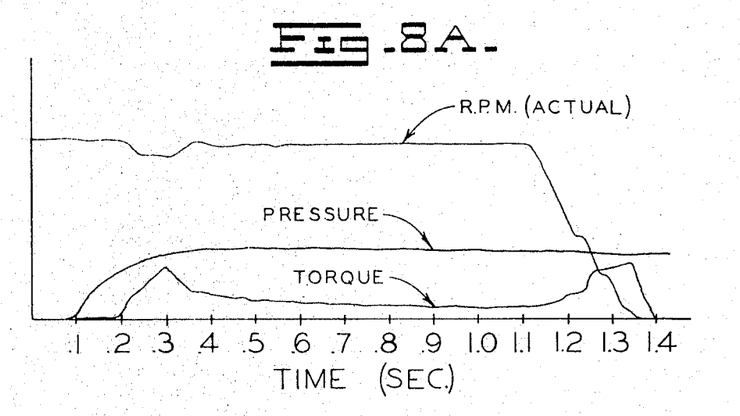
Figure 8B:
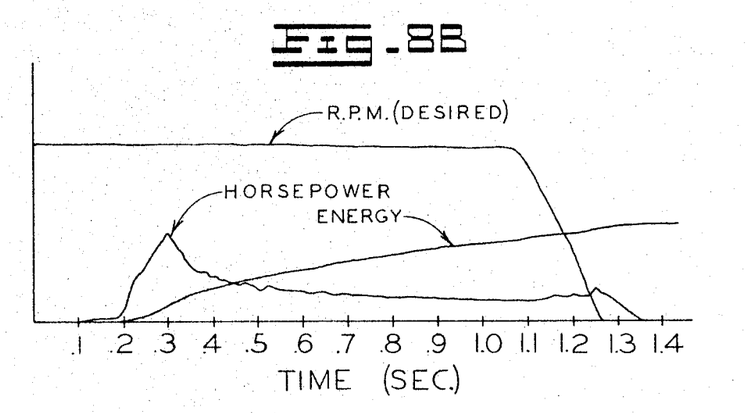

The speed and the load can thus be programmed independently of one another (for example, the speed can be increased while the load is decreased) to avoid excessive torques or extremely low torques and to maintain a uniformly high power input. FIGS. 8A and 8B indicate that the speed programmed welder can be programmed to produce substantially the same constant speed as conventional friction welding. In the weld operation shown in FIGS. 8A and 8B, however, the total process time was somewhat shorter than would normally be used in conventional friction welding.

Figure 9A:
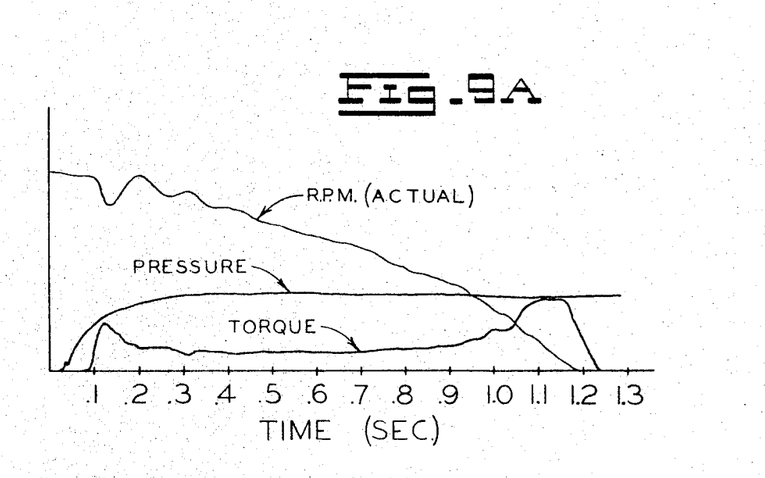
Figure 9B:
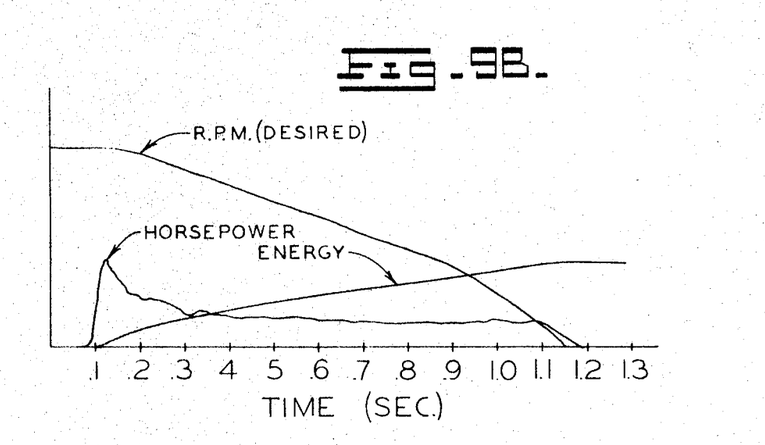

The traces shown in FIGS. 9A and 9B were taken from a weld operation which simulated an inertial weld in which the flywheel speed continuously decreases.

In the weld operation shown in FIGS. 10A and 10B the programmer was programmed to continuously decrease the speed to a speed below the critical range and into an area of heavy plastic working. Then the speed was increased to a level where heating, rather than forging, predominated. Note the lower torque. The speed was then decreased again to the forging range before rotation was ended. This kind of cycle, as noted above, can have specific advantages in eliminating center defects.

The XCO material noted in the sixth horizontal data line of the chart shown in FIG. 11 is a very high carbon, very high alloy valve material which has extreme resistance to temperature, seizing, scuffing and welding. This material was successfully welded under the conditions indicated in FIG. 11 by using a stepped pressure cycle in which the higher pressure was applied at about the point indicated by the vertical line on the speed curve in FIG. 11. This material has been found to be difficult to weld by the inertial process. The total energy and average horsepower columns are blank for the XCO weld because these quantities were not recorded for this particular weld operation.

Figure 4:
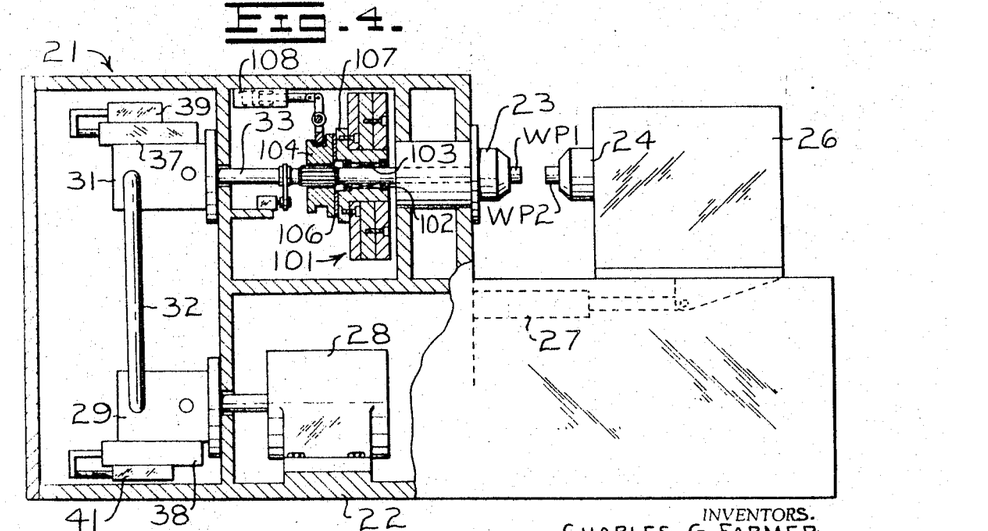
FIG. 4 is a side elevation view, partly broken away to show details of construction, of a speed programmed welder like that shown in FIG. 1 but having inertial weights which can be connected in drive relation to the drive shaft through a one way clutch to supply stored energy to the weld process to thereby extend the range of operation of the speed programmed welder.

In some instances it may be desirable to extend the range of a particular size of welding machine beyond the maximum output torque of the hydrostatic motor. Thus, in some instances it may be desirable to use a smaller size hydrostatic motor and a supplementary drive arrangement for supplying driving torque in excess of that which can be supplied by the hydrostatic motor, rather than to use a larger hydrostatic motor having the necessary maximum torque output. FIG. 4 shows a speed programmed welder with a supplemental flywheel. In FIG. 4 the speed programmed welder is generally like that shown in FIG. 1 except for the addition of the supplemental flywheel 101.

The flywheel 101 is mounted on a carrier 107. The carrier is mounted for rotation on the shaft 33 by bearings 102. The flywheel 101 is also adapted to be connected to drive the shaft 33, under certain conditions of operation to be described below, by a one-way clutch 103.

A collar 104 is spline connected to the shaft 33 so as to be axially shiftable on the shaft. The collar 104 has a friction facing 106. When the friction facing is pressed into engagement with the flywheel carrier 107 the carrier and the flywheel rotate with the shaft 33. A hydraulic cylinder 108 shifts the splined collar 104 to engage the friction face with the flywheel carrier or to disengage the friction facing from the flywheel carrier.

In operation, the cylinder 108 is actuated to clutch the splined collar 104 to the flywheel carrier 107 during a portion of the time that the shaft 33 is being accelerated to the desired initial rotational speed prior to engagement of the parts WP1 and WP2. This causes the flywheel to be accelerated, and when the desired amount of inertial energy has been stored in the flywheel, the splined collar 104 is shifted to disconnect the flywheel 101 from the shaft 33. The flywheel then freewheels on the shaft 33 while the shaft 33, and chuck 23, are accelerated to the desired speed at which the parts are to be initially engaged.

The parts WP1 and WP2 are then engaged in rubbing contact. By properly controlling the pressure of engagement the maximum torque in the initial stage of the weld process can be maintained well within the capacity of the hydrostatic motor 31. However, as the speed is dropped into the forging range, higher torques will be produced, and it is during this phase of operation that the stored energy of the flywheel is used to supplement the torque output of the hydrostatic motor.

As the rotational speed of the shaft 33 drops below the speed at which the flywheel is rotating, the one-way clutch 103 connects the flywheel in drive relation with the shaft 33. The energy stored in the flywheel then assists the hydrostatic transmission in driving the rotating parts through the forging phase of the weld cycle.

Figure 3:
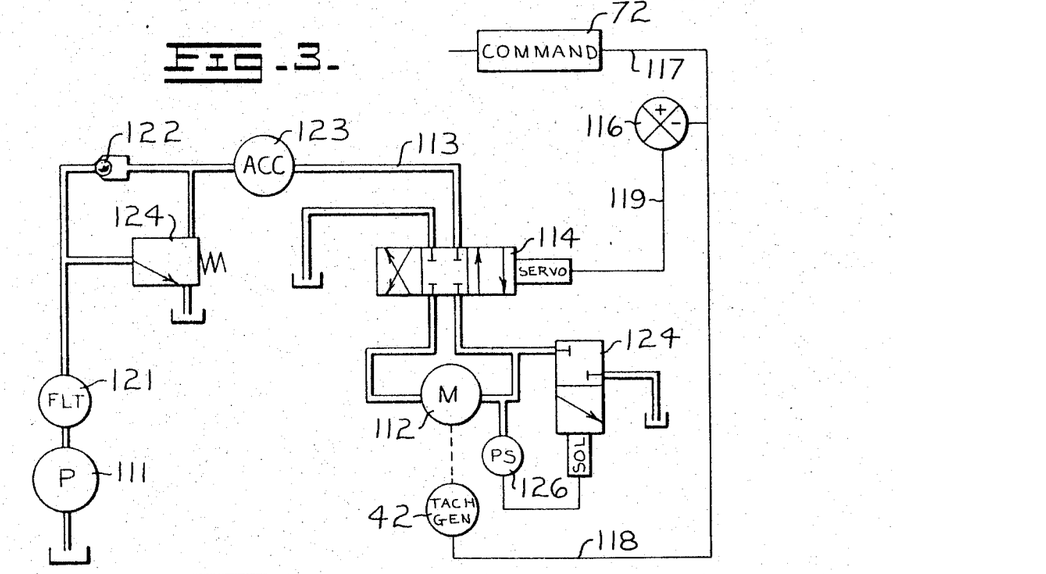
FIG. 3 is a schematic view of a hydraulic circuit for a speed programmed welder constructed in accordance with a third embodiment of the present invention.

FIG. 3 is a schematic view of another form of hydraulic drive for a speed programmed welding machine. In FIG. 3 a fixed displacement pump 111, driven by an electric motor or an internal combustion engine which is not shown, supplies pressurized fluid to a hydraulic motor 112 through a conduit 113.

The motor 112 drives an output shaft, like the output shaft 33 of the machine shown in FIG. 1.

The speed of the motor 112 is determined by the amount of hydraulic fluid supplied through an electrohydraulic servo valve 114. The position of the modulating valve 114 is controlled by a summing junction 116.

The desired speed signal is generated in a programmer 72, and this desired speed signal is supplied to the summing junction through a line 117. The actual speed signal is also supplied to the summing junction from a tachometer 42 through a line 118. Any difference in the desired and actual speed signals is supplied to the valve 114 through a line 119 to cause the valve to move in the proper direction to increase or decrease the flow of hydraulic fluid to the motor 112.

In some conditions of operation the valve 114 may be shifted to the extreme right to tend to drive the motor 112 in reverse and to therefore cause the motor 112 to act as a brake.

The conduit 113 also contains a filter 121, a check valve 122 and an accumulator 123. The accumulator stores pressurized fluid for periods of operation when the drive requirements of the motor require more fluid than can be supplied by the pump 111. A bypass valve 124 is operative to bypass excess pump output when the accumulator has been fully charged and the flow requirements of the motor are less than the output of the pump.

The drive arrangement shown in FIG. 3 also includes means for effecting a rapid disconnect of the drive from the part being rotated. These means include a solenoid actuated dump valve 124. A pressure switch 126 is operatively connected to the solenoid to dump the pressure, and the flow of fluid from the input of the motor 112, when the pressure reaches the predetermined value determined by the switch 126. If the pressure switch 126 is set for a sufficiently low pressure, the switch will disconnect the motor from driving relation with the part being rotated at some point in the final torque rise near the end of the weld process. This normally would not be desired since it would eliminate much of the forging. However, in some particular application this mode of operation might be useful to minimize the overall cycle time for a welding operation.

While we have illustrated and described the preferred embodiments of our invention, it is to be understood that these are capable of variation and modification, and we therefore do not wish to be limited to the precise details set forth, but desire to avail ourselves of such changes and alterations as fall within the purview of the following claims.

What is claimed is:

1. A method of welding workpieces by rotating the workpieces in rubbing contact at a common interface to develop weld heat by friction and plastic working comprising, positively rotating one workpiece, continuously pressing the workpieces together, and controlling the speed of rotation continuously from the time the workpieces are engaged until the weld is completed in accordance with a predetermined program of speed variation by means which are preset to select and produce the predetermined variation of the rotational speed throughout the entire welding period said step of controlling the speed including varying the speed of rotation from a relatively high speed at low torque to a relatively low speed at high torque in accordance with said predetermined program.

2. A method as defined in claim 1 including the steps of rotating the workpiece at said relatively high speed and then reducing the speed to said relatively low speed at which heavy plastic working at high torque is produced and subsequently increasing the speed to spread the heating across the interface and to provide additional center heating to thereby help eliminate center defects.

3. A method as defined in claim 1 including coupling a flywheel to the means rotating the workpiece as the speed of rotation decreases to a predetermined speed to thereby increase the capacity of the apparatus performing the method by adding stored energy at a time when high torque is produced at low rotational speeds.

4. A method as defined in claim 1 including comparing the actual speed with the desired speed by feedback means effective to eliminate differences between the speeds.

5. A method as defined in claim 1 including driving the workpieces in relative rotation by a drive arrangement which includes a variable speed hydrostatic motor.

6. A method as defined in claim 5 including slowing rotation by operating the hydrostatic motor as a brake during a portion of the weld cycle.

7. A method as defined in claim 1 wherein the workpieces are engaged either before the workpiece is rotated or while the workpiece is rotated at low speed and wherein the speed of rotation is subsequently increased to said high speed in a manner to avoid high torques in the initial part of the weld cycle.

8. A method as defined in claim 1 including controlling the force with which the workpieces are engaged in conjunction with control of the speed to avoid both excessively high torques and excessively low torques and to maintain a substantially uniformly high power input to the weld.

9. A method as defined in claim 1 wherein the workpiece is rotated for a period of time in a speed range in which a generally stabilized plastic condition with a substantially uniform torque is produced and wherein the speed is then quickly reduced to a speed range in which the torque increases significantly as a result of heavy plastic working in the weld zone and wherein the rotation at the reduced speed is continued for a period of time sufficiently long to cause the plastic working to effect substantial refinement and reorientation of the plastic material.

References Cited
UNITED STATES PATENTS

| | | | |
|---|---|---|---|
| 3,234,647 | 2/1966 | Hollander et al. | 29—497 X |
| 3,235,160 | 2/1966 | Walton | 228—2 |
| 3,273,233 | 9/1966 | Oberle et al. | 29—470.3 |

JOHN F. CAMPBELL, Primary Examiner

U.S. Cl. X.R.

29—487